UNITED STATES PATENT OFFICE.

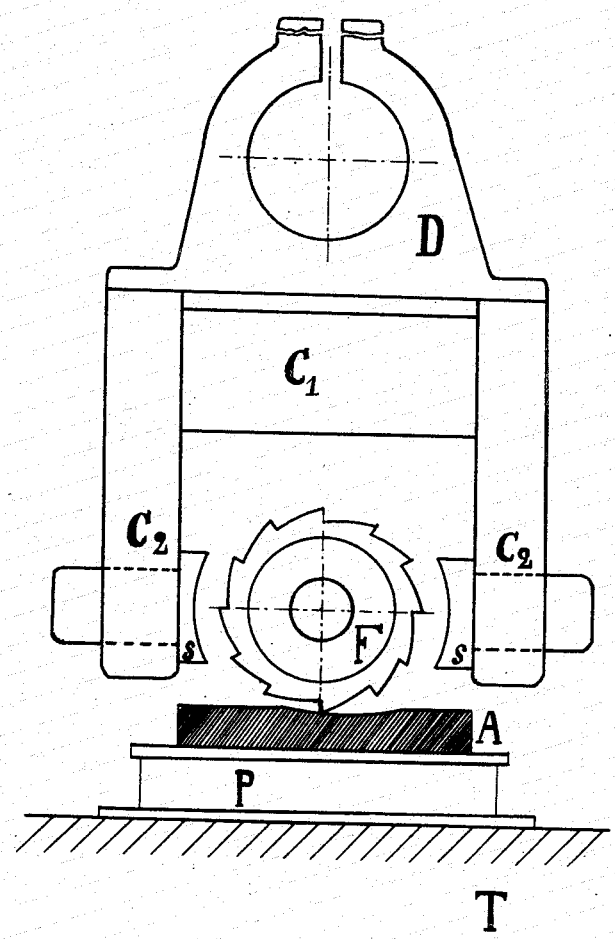

JULIUS BING, OF EISENACH, GERMANY.

DEMAGNETIZATION OF TOOLS WORKING MAGNETICALLY-MOUNTED WORK-PIECES.

1,136,646.   Specification of Letters Patent.   Patented Apr. 20, 1915.

Application filed October 25, 1913.   Serial No. 797,229.

*To all whom it may concern:*

Be it known that I, JULIUS BING, a citizen of the German Empire, and residing at Eisenach, in the State of Saxe-Weimar-Eisenach, Germany, have invented certain new and useful Improvements in the Demagnetization of Tools Working Magnetically-Mounted Work-Pieces, of which the following is a specification.

My invention relates to the demagnetization of tools working magnetically mounted work-pieces.

The employment of magnetic fixing devices for machine-tools heretofore had the disadvantage that in consequence of the magnetic stray field of the plate for fixing work, the operative tool, *e. g.* the milling cutter itself, became magnetic, so that the fine shavings produced when working the set-up work-piece were held fast by it. These shavings injured the surface to be worked as they caused scratches. Heretofore it was necessary to demagnetize the tool on a separate demagnetizing apparatus after removing the tool from the stationary machine. This demagnetization was, however, of only short duration because when the plate for fixing the work was magnetized again by switching on the current, the tool was at once magnetized afresh.

A primary object of my invention is to obviate this serious drawback. To this end, according to my invention the operative tool is exposed to an alternating magnetic field during the entire duration of the working period.

One form of apparatus for carrying my invention into practice is diagrammatically represented by way of example in the accompanying drawing in elevation as applied to a milling machine.

Referring to the drawing, P designates the magnetic plate which holds the work-piece A to be milled, T designates the bed-plate of the machine and F the milling cutter. The demagnetizing device comprises the coil $C_1$, which is traversed by alternating current or by pulsating direct current, and to which the magnet limbs $C_2$, having the pole-pieces $s$ and conducting the magnetic flux is connected. The magnetic flux is conducted in such manner through the pole-pieces $s$ that the teeth of the milling cutter F are surrounded by the alternating magnetic field.

D designates the shackle for attaching the demagnetizing apparatus to the milling machine.

I claim:—

A process of preventing shavings which are cut from magnetically fixed work-pieces from magnetically adhering to the operative tool consisting in constantly exposing the tool to an alternating magnetic field while the same is cutting the work-piece.

In testimony whereof I affix my signature in presence of two witnesses.

JULIUS BING.

Witnesses:
HULDA SCHRÖDER,
ALFRED HOFFMANN.